United States Patent [19]

Osborn

[11] 4,192,762

[45] Mar. 11, 1980

[54] RADIATION CURABLE URETHANE COMPOSITIONS

[75] Inventor: Claiborn L. Osborn, Charleston, W. Va.

[73] Assignee: Union Carbide Corporation, New York, N.Y.

[21] Appl. No.: 898,102

[22] Filed: Apr. 20, 1978

[51] Int. Cl.$^2$ ............... C08G 18/12; C08L 75/04
[52] U.S. Cl. .......................... 252/182; 204/159.15; 204/159.16; 204/159.19; 204/159.22; 526/301
[58] Field of Search .............. 252/182; 204/159.15, 204/159.16, 159.19, 159.22; 260/859 R; 526/301; 427/54

[56] References Cited

U.S. PATENT DOCUMENTS

| | | | |
|---|---|---|---|
| 3,297,745 | 1/1967 | Fekete | 526/301 |
| 3,509,234 | 4/1970 | Burlant et al. | 260/859 R |
| 3,700,643 | 10/1972 | Smith et al. | 526/301 |
| 3,891,523 | 6/1975 | Hisamatsu et al. | 526/301 |
| 4,098,918 | 7/1978 | De Majistre | 526/301 |
| 4,108,840 | 8/1978 | Friedlander | 526/301 |

*Primary Examiner*—Benjamin R. Padgett
*Assistant Examiner*—Irwin Gluck
*Attorney, Agent, or Firm*—Francis M. Fazio

[57] ABSTRACT

Radiation curable urethane compositions obtained by the reaction of an organic polyisocyanate, an hydroxyalkyl acrylyl compound and an hydroxyl compound. The compositions are useful in coatings, inks, adhesives and textile applications.

5 Claims, No Drawings

RADIATION CURABLE URETHANE COMPOSITIONS

BACKGROUND OF THE INVENTION

Radiation curable compositions produced by the reaction of an organic polyisocyanate, an hydroxyalkyl acrylyl compound and a polyhydroxyl compound are known. Thus, in U.S. Pat. No. 3,700,643 issued on Oct. 24, 1972 to Smith et al there are disclosed the reaction products of an organic polyisocyanate, an acrylyl compound and a polyfunctional polycaprolactone. In U.S. Pat. No. 3,509,234 issued on Apr. 28, 1970 to Burlant et al there are disclosed reaction products in which different types of polyfunctional organic polymers are reacted with the organic polyisocyanate and acrylyl compounds. Further, in U.S. Pat. No. 3,297,745 issued on Jan. 10, 1967 to Fekete et al there are disclosed the reaction products of an organic diisocyanate with an ethylenically unsaturated alcohol, which can be an hydroxyalkyl acrylyl compound, with a polyol optionally being present.

SUMMARY OF THE INVENTION

It has now been found that radiation curable urethane compositions can be produced by the reaction of organic diisocyanates with an hydroxyalkyl acrylyl compound and an hydroxyl compound as these are hereinafter defined.

It has also been found that these compositions can be used per se or in further formulated compositions in the coating, ink, adhesive and textile fields. The compositions produced are mixtures of products formed by the reaction; they are generally low viscosity, non-volatile fluids which after addition of photoinitiator cure rapidly on exposure to ultraviolet radiation, even when exposure is conducted in an air atmosphere. The products can also be cured by thermal means using free radical initiators or by other types of particulate or non-particulate radiation.

DESCRIPTION OF THE INVENTION

The radiation curable urethane compositions of this invention are the reaction products of three reactants. The compositions are mixtures of the reaction products obtained by the reaction of (I) an organic polyisocyanate, (II) an hydroxyalkyl acrylyl compound and (III) a monohydroxyl compound that does not contain acrylyl functionality. When produced in accord with this invention and the proper mole ratios of II and III are used there is obtained a composition which is liquid and of relatively low viscosity that cures rapidly when mixed with a photoinitiator and exposed to ultraviolet light. The cured films on substrates show highly desirable properties. Proper adjustment of the mole ratio of II and III permits a high degree of latitude in designing compositions for a desired end use and in obtaining compositions having the flexibility, hardness, viscosity and cure rate needed for a particular application.

The organic polyisocyanates (I) that can be used to produce the radiation curable urethane compositions of this invention are the aliphatic and aromatic isocyanates. These compounds are well known to those skilled in the art and many are available in commercial quantities. Illustrative thereof one can mention 3,5,5-trimethyl-1-isocyanato-3-isocyanatomethyl-cyclohexane, di(2-isocyanatoethyl)bicyclo[2.2.1]hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, 4,4'-diisocyanatophenyl methane, cyclohexane-1,4-diisocyanate, 1,5-naphthalene diisocyanate, 4,4'-diisocyanato diphenyl ether, 2,4,6-triisocyanato toluene, 4,4',4'-triisocyanato triphenyl methane, isophorone diisocyanate, p-phenylene diisocyanate, diphenylene-4,4-diisocyanate, the polymethyl polyphenylisocyanates, as well as any of the other organic polyisocyanates known to the average skilled chemist. The organic isocyanates can be used individually or mixtures of two or more thereof can be employed. The preferred polyisocyanates are the diisocyanates.

The hydroxyalkyl acrylyl compounds (II) that are useful can be represented by the general formula:

$$\underset{\mathrm{CH_2{=}CCOOXOH}}{\overset{Z}{|}} \qquad \mathrm{(II)}$$

in which Z is hydrogen or methyl and X is a linear or branched divalent alkylene group having from 2 to 5 carbon atoms. Illustrative thereof one can mention 2-hydroxyethyl acrylate, 2-hydroxyethyl methacrylate, 2-hydroxypropyl acrylate, 2-hydroxypropyl methacrylate, 2-hydroxypentyl acrylate, 3-hydroxypropyl acrylate, and the like.

The hydroxyl compound (III) used in the reaction with the organic polyisocyanate and the hydroxyalkyl acrylyl compounds are represented by the general formula:

$$R(OC_nH_{2n})_mOH \qquad \mathrm{(III)}$$

wherein R is a linear or branched alkyl group of from 1 to 25 carbon atoms, preferably from 1 to 15 carbon atoms; an alkaryl or aralkyl group having from 7 to 20 carbon atoms, preferably from 7 to 15 carbon atoms; an aryl group having from 6 to 10 carbon atoms such as phenyl or naphthyl; or a cycloalkyl group having from 5 to 10 ring carbon atoms; n is an integer having a value of from 2 to 4 preferably 2 or 3; and m has a value of from 1 to 70, preferably from 1 to 25. These hydroxyl compounds can be unsubstituted or they can contain substituents that do not have a deleterious effect on the reaction or on the use of the radiation curable urethane compositions produced. Illustrative of the hydroxyl compounds one can mention the methyl, ethyl, propyl monoethers of polyethylene glycol having an average molecular weight of from 76 to 3,000; phenoxy ethanol, 2-butoxy isopropanol, 2-hexoxyethoxy ethanol, 2-methoxyisopropoxy isopropanol, the adducts of nonylphenol with from 3 to 100 moles of ethylene oxide, the adducts of dodecylphenol with from 3 to 100 moles of ethylene oxide, the adducts of a mixture of $C_{11}$ to $C_{15}$ linear alcohols with from 3 to 100 moles of ethylene oxide, methanol, and the like.

In producing the radiation curable urethane compositions the stoichiometry of the amounts of hydroxyalkyl acrylyl compound (II) and the hydroxyl compound (III) reacted with the polyisocyanate must be carefully controlled to produce a product or composition having the unique properties needed in a radiation curable formulation. The composition must have sufficient acrylyl functionality from (II) to maintain the radiation curability aspects of the product and of the same time there must be a sufficient amount of the non-radiation curable or acrylyl-function-free hydroxyl compound (III) to yield a non-crystalline, fluid product that will eventually cure to a final product having acceptable film properties. In order to achieve these goals an equivalent amount of total hydroxyl groups to isocyanato groups is required; generally however, one can use a slight excess of hydroxyl groups. The ratio of hydroxyl groups derived from the hydroxyalkyl acrylyl compound (II) to the hydroxyl groups derived from the hydroxyl compound (III) is important. For the purposes of this invention from 50 to 98 mole percent, preferably from 60 to 75 mole percent, of the total hydroxyl components initially charged are hydroxyalkyl acrylyl compounds (II) and the balance are the hydroxyl compounds (III). Thus, these other hydroxyl compounds (III) constitute from 2 to 50 mole percent, preferably from 25 to 40 mole percent of the total hydroxyl components (II plus III) initially charged.

The reaction is carried out at a temperature of from about 25° C. to 80° C., preferably from 40° C. to 65° C. The reaction can be carried out at atmospheric or super-atmospheric pressure. In view of the ready reactivity of isocyanato groups with moisture, the reaction is conducted under essentially anhydrous conditions. In a typical embodiment the polyisocyanate and catalyst are added to the reactor, warmed and the hydroxyl components are slowly added, either as a mixture or as separate streams, and the reaction is then permitted to proceed to completion.

The catalyst employed can be any one of the known urethane catalysts such as the amine or tin compounds. These catalysts are so well known that they should not require more than brief mention; they are also used in the conventional amounts known to those skilled in the art. Illustrative there of one can mention triethylene diamine, morpholine, N-ethylmorpholine, piperazine, triethanolamine, triethylamine, N,N,N',N'-tetramethylbutane-1,3-diamine, dibutyltin dilaurate, stannous octoate, stannous laurate, dioctyltin diacetate, stannous oleate, stannous tallate, dibutyltin oxide, etc.

There can also be present in the reaction mixture a solvent which is non-reactive with the isocyanato group. For this purpose any inert organic solvent can be used, or one can use a liquid acrylate that will remain in the final mixture and that will react when the final mixture is cured by radiation. Illustrative of useful solvents one can mention butyl acrylate, trimethylolpropane triacrylate, hexanediol diacrylate, 2-ethylhexyl acrylate, methoxyethyl acrylate, diethylene glycol diacrylate, pentaerythritol triacrylate, neopentyl glycol diacrylate, 2,2-dimethyl-3-hydroxypropyl 2,2-dimethyl-3-hydroxypropionate diacrylate, or any other solvent inert to the isocyanato group.

As has been indicated, the composition of this invention is a mixture of components obtained by the interreaction of the organic polyisocyanate compound, the hydroxyalkyl acrylyl compound and the hydroxyl compound. A general chemical reaction sequence for the reaction using a diisocyanate in the reaction is shown below:

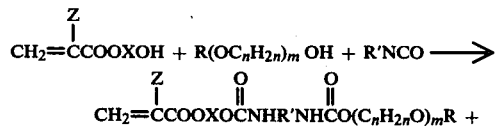

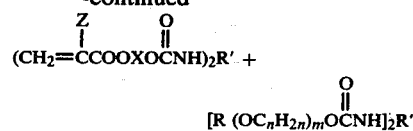

While applicant has shown this reaction sequence for the simple reaction illustrated, the reaction becomes more complicated when tri-or higher isocyanates are used. Therefore, applicant does not intend to be bound by the above theoretical explanation other than to the extent shown.

The radiation curable urethane compositions can be used either alone or in admixture with other known reactive or non-reactive solvents, resins, oligomers, crosslinkers, pigments, fillers, dispersants or other additives normally added to coatings, inks or adhesives. These compounds are well known to those skilled in the art and when employed they are used in the conventional amounts.

When the compositions are to be cured by thermal means, a free radical initiator or catalyst is present at a concentration of from 0.1 to 5 weight percent. Illustrative thereof are benzoyl peroxide, lauroyl peroxide, di-n-butyl peroxide, t-butyl peracetate, perbenzoic acid, dicumyl peroxide, potassium persulfate, azo-bis-isobutyronitrile, the redox catalyst systems, the percarbonate catalysts. Thermal cure is carried out at a temperature up to about 100° C., or higher.

When cure is to be accomplished by light radiation, e.g., ultraviolet, a photosensitizer is added at a concentration of from 0.1 to 15 weight percent, preferably 1 to 5 weight percent. These can be used singly, in mixtures, or in combination with known synergists or activators. Illustrative thereof one can mention benzophenone, benzoin, the benzoin ethers, acetophenone, 2,2-diethoxyacetophenone, 2,2-dimethoxy-2-phenylacetophenone, 2,2-di-sec-butoxyacetophenone, p-methoxybenzophenone, m-chloroacetophenone, chlorothioxanthone, propiophenone, benzil, diacetyl benzene, benzaldehyde, napthaquinone, xanthone, anthraquinone, p,p'-N,N-dimethylaminobenzophenone, or any of the know photosensitizers.

Cure by high energy ionizing radiation such as electron beam, Van der Graff accelerator, linear accelerator, cobolt-60 strontium-90, or similar radiation means, does not require the use of an activator, catalyst or photosensitizer in the composition.

The cure time required for a particular application will vary depending upon the particular composition, the type of radiation employed, the amount of material applied, the surrounding atmospheric conditions, and other factors, all known to those skilled in the art.

In the following examples the Sward Hardness was determined by the procedure described on page 164 to 166 in "Physical and Chemical Examination of Paints, Varnishes, Lacquers, and Colors", 1950 11th Edition, Gardner Laboratory, Bethesda, Md. Acetone resistance, a measure of through cure, was determined by placing a small swatch of cotton or absorbent paper towel saturated with acetone on the cured film and determining the time, in seconds, required for the film to be lifted off the substrate. During the test the cotton or towel was kept saturated with acetone by the addition of small amounts of acetone with a dropper.

The following examples serve to further illustrate the invention. In the general procedure used to produce the radiation curable urethane compositions in the examples, a reaction flask equipped with a stirrer, thermometer, dropping funnel and reflux condenser was initially charged with the organic polyisocyanate and 0.5 gram of dibutyltin dilaurate. This solution was warmed to 45° C. and a previously prepared mixture of the hydroxyalkyl acrylyl compound and the hydroxyl compound was added in a dropwise manner over a one hour period at 45°–50° C. while continually stirring the reaction. In some instances, after completion of the addition of the reactive components, a non-reactive solvent was added to adjust the total solids content and viscosity of the composition. In all instances the reaction mixture was stirred an additional six hours at 45°–50° C. and analyzed for free isocyanato content. Stirring and heating were continued until the free isocyanato content was less than 0.5 percent. At that point the reaction was stopped and the radiation curable urethane composition produced was transferred to a suitable container for storage and future use. The results are tabulated below. In the tabulation the components charged are identified by the following code designations:

Organic Polyisocyanates

A—Tolylene diisocyanate
B—Isophorone diisocyanate
C—Trimethylhexamethylene diisocyanate
D—Bis(4-isocyanatocyclohexyl)methane

Hydroxyl Compounds

E—Methoxy polyethylene glycol, average molecular weight about 550
F—Phenyl glycol ether
G—2-Butoxyisopropanol
H—Mono n-hexyl ether of diethylene glycol
I—Mono ethyl ether of dipropylene glycol
J—Adduct of nonylphenol with 40 moles of ethylene oxide
K—Adduct of a mixture of $C_{11}$ to $C_{15}$ linear alcohols with 15 moles of ethylene oxide
L—Adduct of a mixture of $C_{11}$ to $C_{15}$ linear alchols with 40 moles of ethylene oxide
M—Same as L with 30 moles of ethylene oxide
N—Same as J with 4 moles of ethylene oxide
O—Same as J with 20 moles of ethylene oxide
P—Same as J with 10.5 moles of ethylene oxide
Q—Adduct of dodecylphenol with 6 moles of ethylene oxide
R—Same as L with 3 moles of ethylene oxide
T—Methoxy polyethylene glycol, average molecular weight about 350

Non-reactive Solvent

I—Trimethylolpropane triacrylate
II—2,2-Dimethyl-3-hydroxypropyl 2,2-dimethyl-3-hydroxypropionate
III—Butyl acrylate
IV—Hexanediol diacrylate

Hydroxyalkyl Acrylate

HEA—2-Hydroxyethyl acrylate

TABULATION OF EXAMPLES

| Examples | HEA (g) | Organic Isocyanate (g, type) | Hydroxyl Compound (g, type) | Non-Reactive Solvent (g, type) | Visc. cps./T, °C. |
|---|---|---|---|---|---|
| 1 | 236 | 184g, A | 55 E | 53 I | |
| 2 | 212 | 193g, A | 220 E | 69 I | |
| 3 | 118 | 96G, A | 55 E | 30 I | |
| 4 | 106 | 96g, A | 110 E | 35 I | |
| 5 | 106 | 96g, A | 110 E | 35 I | 7940/24° C. |
| 6 | 106 | 96g, A | 110 E | 35 I | |
| 7 | 106 | 96g, A | 110 E | 35 II | |
| 8 | 106 | 96g, A | 110 E | 17 III | |
| 9 | 106 | 96g, A | 30 F | 35 I | |
| 10 | 212 | 193g, A | 53 G | 51 I | 2648/56° C. |
| 11 | 212 | 193g, A | 76 H | 53 I | 1801/56° C. |
| 12 | 212 | 193g, A | 59 I | 52 I | 3030/56° C. |
| 13 | 106 | 96g, A | 396 J | 66 I | |
| 14 | 212 | 193g, A | 344 K | 83 I | 902/56° C. |
| 15 | 53 | 48g, A | 196 L | 33 I | 944/56° C |
| 16 | 106 | 96g, A | 304 M | 56 I | 632/56° C. |
| 17 | 212 | 192g, A | 158 N | 63 I | 2930/56° C. |
| 18 | 106 | 96g, A | 220 O | 47 I | |
| 19 | 212 | 193g, A | 273 P | 75 I | 1444/56° C. |
| 20 | 212 | 193g, A | 210 Q | 68 I | 2116/56° C. |
| 21 | 212 | 193g, A | 158 N | 63 I | 2980/56° C. |
| 22 | 212 | 193g, A | 133 R | 60 I | 836/56° C. |
| 23 | 106 | 96g, A | 304 M | — | 920/56° C. |
| 24 | 212 | 193g, A | 133 R | — | 1888/56° C. |
| 25 | 212 | 193g, A | 133 R | — | 2184/55° C. |
| 26 | 212 | 193g, A | 53 G | 51 II | 1848/55° C. |
| 27 | 212 | 193g, A | 53 G | 51 IV | 828/55° C. |
| 28 | 147 | 174g, A | 249 R | — | 898/55° C. |
| 29 | 147 | 174g, A | 262 T | — | |
| 30 | 206 | 147g, A | 86 T | — | 2800/55° C. |
| 31 | 177 | 222g, B | 175 T | — | |
| 32 | 177 | 210g, C | 175 T | — | 180/55°C. |
| 33 | 177 | 262g, D | 175 T | — | solid |
| 34 | 174 | 174g, A | 262 T | — | |
| 35 | 177 | 222g, B | 175 T | — | |
| 36 | 177 | 262g, D | 175 T | — | |

The radiation curable urethane compositions produced in Examples 1 to 36 were evaluated by applying a thin film of the liquid composition to steel test panels with a wire-wound rod. The films were then cured by exposure to ultraviolet light radiation having an ultraviolet flux nominally equivalent to 500 watts per square foot; the radiation source consisted of three nominally 100 watt per lineal inch medium pressure mercury vapor lamps. The compositions that were cured in an air atmosphere contained 5 weight percent benzophenone as the photoinitiator; the compositions cured in a nitrogen atmosphere contained 1 weight percent of 2,2-diethoxyacetophenone as the photoinitiator. The conditions of cure and properties of the cured films produced are set forth in the following table. The notation PSCU refers to a nitrogen inerted ultraviolet radiation source containing sixteen interfocused one watt per lineal inch germicidal lamps, predominantly emitting 2,537 Angstroms ultraviolet light.

FILMS; CURE CONDITIONS AND PROPERTIES

| Example | Film Thickness mils | Cure Time (sec) Air | N2 | Sward Hardness Length | Width | Acetone Resistance (sec) |
|---|---|---|---|---|---|---|
| 1 | 0.1 mil | 3.6 | 60 | | | |
| 2 | 0.1 | 3.6 | 100 (PSCU) | | | |
| 5 | 0.1 | 1.8 | | 14 | 10 | 300 |

-continued

FILMS; CURE CONDITIONS AND PROPERTIES

| Example | Film Thickness mils | Cure Time (sec) Air | N2 | Sward Hardness Length | Width | Acetone Resistance (sec) |
|---|---|---|---|---|---|---|
| 5 | 0.1 | 3.6 | | 24 | 18 | 300 |
| 5 | 0.1 | | 1.8 | 34 | 30 | 300 |
| 5 | 0.1 | | 0.9 | 32 | 28 | 300 |
| 6 | 0.5 | 0.9 | | 22 | 18 | |
| 6 | 0.1 | 0.9 | | 26 | 20 | |
| 7 | 0.5 | 0.9 | | 18 | 16 | |
| 7 | 0.1 | 3.6 | | 28 | 24 | |
| 8 | 1.0 | | 100 | 12 | 12 | 300 |
| 8 | 0.1 | 0.9 | | 14 | 10 | 300 |
| 9 | 1.0 | | 100 | 18 | 22 | 186 |
| 9 | 0.1 | 0.9 | | 20 | 18 | 300 |
| 10 | 0.1 | 7.2 | | 40 | 54 | |
| 10 | 1.0 | | 1.8 | 42 | 40 | 121 |
| 11 | 0.5 | 7.2 | | 26 | 18 | |
| 11 | 0.1 | 5.4 | | 56 | 52 | |
| 11 | 1.0 | | 1.8 | 44 | 34 | 90 |
| 12 | 0.1 | 5.4 | | 58 | 58 | |

Table II

| Ex. | Film Thickness mils | Cure Time (sec) Air | N2 | Sward Hardness Length | Width | Acetone Resistance (sec) |
|---|---|---|---|---|---|---|
| 12 | 1.0 | | 1.8 | 48 | 34 | 237 |
| 13 | 0.1 | 3.6 | | 10 | 10 | |
| 13 | 1.0 | | 1.8 | 10 | 10 | 19 |
| 14 | 0.5 | 3.6 | 10 | 8 | | |
| 14 | 0.1 | 3.6 | | 18 | 16 | |
| 14 | 1.0 | | 1.8 | 26 | 20 | 88 |
| 15 | 0.1 | 7.2 | | 26 | 22 | |
| 15 | 1.0 | | 1.8 | 10 | 10 | 20 |
| 16 | 0.1 | 1.8 | | 10 | 18 | |
| 16 | 1.0 | | 1.8 | 8 | 8 | 35 |
| 17 | 1.0 | | 1.8 | 44 | 32 | 86 |
| 18 | 1.0 | | 1.8 | 18 | 16 | 114 |
| 19 | 1.0 | | 1.8 | 34 | 24 | 141 |
| 20 | 1.0 | | 1.8 | 38 | 22 | 116 |
| 21 | 1.0 | | 1.8 | 48 | 38 | 82 |
| 22 | 1.0 | | 1.8 | 48 | 36 | 99 |
| 25 | | 7.2 | | 30 | 30 | 175 |
| 26 | | | 1.8 | 50 | 44 | 87 |
| 27 | | 9.0 | | 46 | 44 | 300 |
| 28 | | | 1.8 | 24 | 22 | 25 |
| 30 | 1.0 | | 1.8 | 46 | 34 | 300 |
| 32 | 1.0 | | 1.8 | 6 | 4 | 41 |
| 34 | 1.0 | | 1.8 | 8 | 6 | 39 |
| 35 | 1.0 | | 1.8 | 30 | 22 | 66 |
| 36 | 1.0 | | 1.8 | 34 | 20 | 300 |

What is claimed is:

1. A radiation curable urethane composition comprising the reaction product of (I) an organic polyisocyanate, (II) an hydroxyalkyl acrylate of the formula

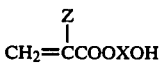

wherein Z is hydrogen or methyl and K is a divalent alkylene group of from 2 to 5 carbon atoms and (III) an hydroxyl compound of the formula:

$$R(OC_nH_{2n})_mOH$$

wherein R is a member of the group of alkyl having from 1 to 25 carbon atoms, alkaryl or aralkyl having from 7 to 10 carbon atoms, aryl having from 6 to 10 carbon atoms, or cycloalkyl having from 5 to 10 ring carbon atoms; n is an integer having a value of from 2 to 4; and m is an integer having a value of from 1 to 70; and wherein the mole percent of (II):(III) is from 50 to 98:50 to 2.

2. A radiation curable urethane composition as claimed in claim 1, wherein the mole percent of (II):(III) is from 60 to 75:40 to 25.

3. A radiation curable urethane composition as claimed in claim 1, wherein component (I) is a diisocyanate.

4. A radiation curable urethane composition as claimed in claim 1, wherein component (I) is tolylene diisocyanate, component (II) is 2-hydroxyethyl acrylate and component (III) is an adduct of an alkylphenol with from 3 to 100 moles of ethylene oxide.

5. A radiation curable urethane composition as claimed in claim 1, wherein component (I) is tolylene diisocyanate, component (II) is 2-hydroxyethyl acrylate and component (III) is an adduct of a mixture of $C_{11}$ to $C_{15}$ linear alcohols with from 3 to 100 moles of ethylene oxide.

* * * * *

UNITED STATES PATENT AND TRADEMARK OFFICE
CERTIFICATE OF CORRECTION

PATENT NO. : 4,192,762
DATED : March 11, 1980
INVENTOR(S) : Claiborn L. Osborn

It is certified that error appears in the above—identified patent and that said Letters Patent is hereby corrected as shown below:

In Column 3, line 65, R'NCO should be read as

---OCNR'NCO---

Signed and Sealed this

Twenty-third Day of June 1981

[SEAL]

Attest:

RENE D. TEGTMEYER

Attesting Officer    Acting Commissioner of Patents and Trademarks